United States Patent
Kawamura

[11] Patent Number: 5,986,252
[45] Date of Patent: Nov. 16, 1999

[54] LASER MONITOR APPARATUS AND A LASER APPARATUS

[75] Inventor: Kouji Kawamura, Chiba-ken, Japan

[73] Assignee: Miyachi Technos Corporation, Chiba-ken, Japan

[21] Appl. No.: 09/042,621

[22] Filed: Mar. 17, 1998

[30] Foreign Application Priority Data

Mar. 19, 1997 [JP] Japan ................................. 9-085930

[51] Int. Cl.⁶ .............................. G01J 1/32; H05B 37/02; H01S 3/03
[52] U.S. Cl. ........................ 250/205; 250/206; 315/158; 372/31
[58] Field of Search .................................. 250/205, 206; 372/9, 25, 26, 29–33, 38; 315/151, 158, 159

[56] References Cited

U.S. PATENT DOCUMENTS

| | | | |
|---|---|---|---|
| 4,845,720 | 7/1989 | Koishi et al. ............................ | 250/205 |
| 4,894,525 | 1/1990 | Kakuta .................................... | 315/158 |
| 5,059,210 | 10/1991 | Kakuta et al. .......................... | 250/205 |
| 5,287,367 | 2/1994 | Wight et al. ............................. | 372/31 |

*Primary Examiner*—Stephone Allen
*Attorney, Agent, or Firm*—Wenderoth, Lind & Ponack, L.L.P.

[57] ABSTRACT

In a laser beam processing apparatus, a laser monitor comprises a photo sensor, a laser power measuring circuit, an A-D converter, a monitor control unit, a comparison decision unit, a display control unit, a display, an alarm generating circuit and a buzzer. A measured laser power signal (analog voltage signal) representative of an instantaneous value of laser power of a pulsed laser beam is produced by the photo sensor and the laser power measuring circuit, and the digital measured laser power signal from the A-D converter is supplied to the comparison decision unit and to the monitor control unit. The monitor control unit sets or determines a monitor reference waveform corresponding to a laser control reference waveform used for waveform control in the processing apparatus and controls the comparison decision unit. The comparison decision unit provides a monitoring decision on the power of the pulsed laser beam, which is displayed by a visual presentation or by display lamps on the display.

7 Claims, 7 Drawing Sheets

LASER MONITOR APPARATUS AND A LASER APPARATUS

BACKGROUND OF THE INVENTION

The present invention relates to a laser apparatus of the waveform control type and a laser monitor apparatus for use therewith.

A pulsed laser beam processing apparatus employs a method to variably control a laser power waveform of a pulsed laser beam in order to meet various processing requirements. In accordance with the waveform control method, a desired reference waveform of laser power is preset into the laser beam processing apparatus. In the laser beam processing apparatus, a laser electric power supply which supplies electric power to a laser oscillator is controlled by an open-loop control or a closed-loop control so that the power of the laser beam oscillated from the laser oscillator can follow the reference waveform.

A laser monitor apparatus for monitoring laser power, which is incorporated in a laser beam processing apparatus or has the form of an independent unit electrically connected thereto, has been used for the sake of quality control in a laser beam processing site.

In the prior art laser monitor apparatus, a part of a laser beam is projected on a photo detector such as photo-diode which produces an electric signal (a laser detection signal) corresponding to the laser power or intensity of light of the laser beam. The signal is integrated to obtain a measured value of laser energy (Joule) per unit time or one pulse. Judging how far apart the measured laser energy value is from a predetermined reference value or whether the measured value is within the limit of a predetermined monitoring value or not, the laser monitor apparatus outputs decision on whether the laser beam processing has been performed normally or not, or whether the resulting quality of processing is good or not.

However, such laser monitor apparatus has not worked effectively in the above type of laser apparatus using waveform control method. In the waveform control method, it is important how closely an actual laser power waveform follows a reference waveform. The prior art laser monitor apparatus makes a decision of good or bad on the quality of processing on the basis of a measured value (mean value) of laser energy per unit time or one pulse. Therefore, even if the actual laser power waveform deviates so far apart from the reference waveform as to influence the quality of processing, the laser monitor apparatus may determine the processing to be normal, failing to determine it to be defective, as long as the total laser energy or the average laser energy of the whole pulse is within the allowable range.

SUMMARY OF THE INVENTION

With the above problems in mind, an object of the invention is to provide a laser monitor apparatus capable of being adaptive to any type of reference waveform used in a laser power waveform control method and providing monitor information useful for quality control.

Another object of the invention is to provide a laser apparatus capable of performing laser power waveform controlling by using any type of reference waveform and of providing monitor information useful for quality control.

In accordance with an aspect of the invention, a laser monitor apparatus comprises:

reference waveform setting means for setting a monitor reference waveform corresponding to a reference waveform for waveform control used in a laser apparatus;

first monitoring condition setting means for setting one or more of monitoring sections or points in any desired periods or at any desired points of time in said monitor reference waveform;

second monitoring condition setting means for setting a monitoring waveform or monitoring value as an upper and/or lower limit being offset by a desired allowable value from said monitor reference waveform in each of said monitoring sections or points;

measuring means for measuring the laser power of said laser beam or a corresponding predetermined electric parameter;

comparing means for comparing a measured value provided by said measuring means with said monitoring waveform or value at each of said monitoring sections or points; and decision means for providing a monitor decision result based on the comparison result from said comparing means.

The reference waveform setting means may comprise a setting means for setting said monitor reference waveform based on the measured value provided by said measuring means.

The first monitoring condition setting means may comprise a setting means for individually setting allowable values in said monitoring sections or points.

The decision means may comprise means for analyzing and integrating a comparison result from said comparison means to provide a monitor decision on whether the laser beam processing has been normal or defective.

In accordance with another aspect of the invention, a laser apparatus comprises:

laser oscillation means supplied with electric power for oscillating a laser beam;

laser electric power supply means for supplying electric power to said laser oscillation means;

first reference waveform setting means for setting a desired reference waveform for waveform control with respect to the laser power of said laser beam or a corresponding predetermined electric parameter;

laser control means for controlling said laser electric power supply means so that the laser power of said laser beam or said predetermined electric parameter can follow said reference waveform for waveform control;

second reference waveform setting means for setting a monitor reference waveform corresponding to said reference waveform for waveform control;

first monitoring condition setting means for setting one or more of monitoring sections or points in any desired periods or at any desired points of time in said monitor reference waveform;

second monitoring condition setting means for setting a monitoring waveform or monitoring value as an upper and/or lower limit being offset by a desired allowable value from said monitor reference waveform in each of said monitoring sections or points;

measuring means for measuring the laser power of said laser beam or the corresponding predetermined electric parameter;

comparing means for comparing a measured value provided by said measuring means with said monitoring waveform or value at each of said monitoring sections or points; and decision means for providing a monitor decision result based on the comparison result from said comparing means.

The predetermined parameter may be at least one of an electric power, a current and a voltage supplied from said laser electric power supply means to said laser oscillation means.

In accordance with the laser monitor apparatus and the laser apparatus of the present invention, with respect to a laser power waveform of a pulsed laser beam to be variably controlled by a waveform control method, one or more desired monitoring sections or points and upper and/or lower monitoring waveforms or monitoring points defining desired allowable ranges in the monitoring sections or points are set to make a monitoring decision, thereby being adaptive to any type of laser power waveform of pulsed laser beam for providing useful information for quality control.

BRIEF DESCRIPTION OF THE DRAWINGS

The above and other objects, features and advantages of the invention will become more apparent from the following description taken in conjunction with the drawings in which.

DETAILED DESCRIPTION OF PREFERRED EMBODIMENTS

The invention will be now described in detail with respect to preferred embodiments by reference to the drawings.

Figure 1:
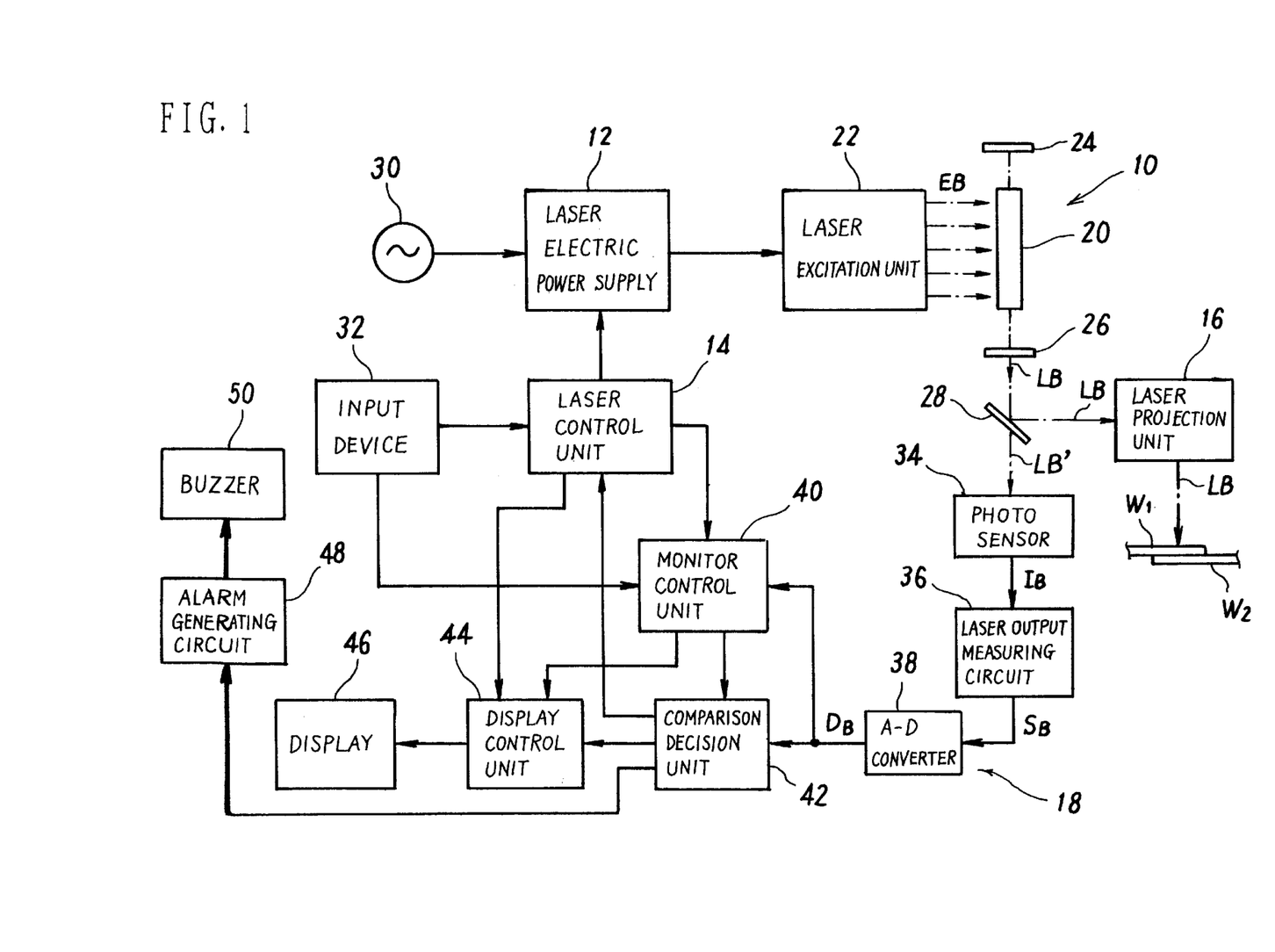
FIG. 1 is a block diagram showing a principal arrangement of a pulsed laser processing apparatus of one embodiment.

Referring to FIG. 1, a pulsed laser beam processing apparatus according to an embodiment of the invention comprises a laser oscillator 10, a laser electric power supply 12, a laser control unit 14, a laser projection unit 16, a laser monitor 18 and so on.

The laser oscillator 10 comprises a solid-state laser medium 20 made of YAG (Yttrium-Aluminum-Garnet) for instance, a laser excitation source 22 to project (supply) a laser excitation beam EB to the solid-state laser medium 20 and a pair of optical resonance mirrors 24 and 26 to amplify a laser beam produced from the solid-state laser medium 20 and to output a pulsed laser beam LB.

The pulsed laser beam LB oscillated and output from the laser oscillator 10 is sent via a mirror 28 to the laser projection unit 16, from which the pulsed laser beam LB is projected onto a workpiece, for instance workpieces to be welded ($W_1$, $W_2$).

The laser electric power supply 12 for supplying electric power for laser oscillation to the laser excitation source 22 of the laser oscillator 10 converts a commercial AC power from a commercial AC power supply 30 under the control of the laser control 14 into a suitable electric power, current and voltage, to drive the laser excitation source 22.

The laser control unit 14 serves to control the laser electric power supply 12 so that a desired laser beam LB is produced from the laser oscillator 10. Especially, in the waveform control function of the embodiment, the laser control unit 14 controls the laser electric power supply 12 by an open-loop or a closed-loop (feedback) control method so that the power of the pulsed laser beam LB or a corresponding predetermined electric parameter can follow a preset laser control reference waveform.

For instance, a driving current, driving voltage or driving electric power supplied to the laser excitation source 22 from the laser electric power supply 12 may be selected as such electric parameter corresponding to the power of the laser beam LB. The laser control unit 14 may comprise a microcomputer. Selected values or data of laser control reference waveform are input to the laser control unit 14 from an input device 32 such as keyboard, mouse and so on.

The laser monitor 18 comprises a photo sensor 34, a laser power measuring circuit 36, an analog-to-digital (A-D) converter 38, a monitor control unit 40, a comparison decision unit 42, a display control unit 44, a display 46, an alarm generating circuit 48 and a buzzer 50.

The photo sensor 34 comprising a photo-diode for instance, receives a laser beam LB' that is a part (e.g. 0.1%) of the laser beam LB and that has transmitted a mirror 28 to produce an electric current (photo-current) $I_B$ corresponding to the laser power or intensity of light of the pulsed laser beam LB. The laser power measuring circuit 36, which includes a current-to-voltage converting circuit to convert the photo-current from the photo sensor 34 into a corresponding voltage, generates a measured laser power signal (analog voltage signal) $S_B$ representing the instantaneous value of power of a pulsed laser beam LB. The measured laser power signal $S_B$ from the laser power measuring circuit 36 is converted into a corresponding digital signal at a predetermined sampling frequency, and the digital measured laser power signal $D_B$ is supplied to the comparison decision unit 42 and to the monitor control unit 40.

When the power of a pulsed laser beam LB is to be fedback for waveform control, the measured laser power signal $D_B$ output from the A-D converter 38 may be supplied to the laser control unit 14, too.

Figure 2:
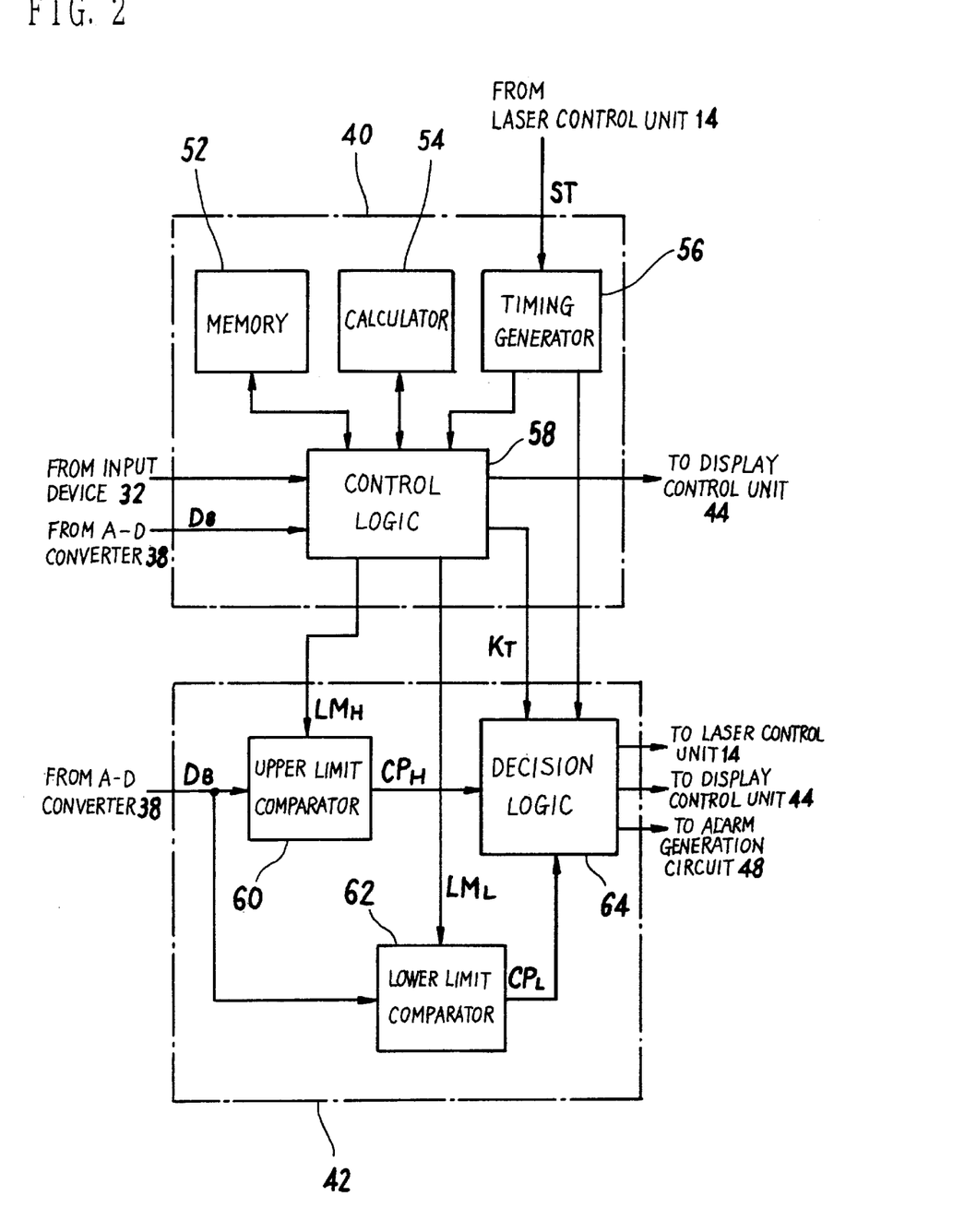
FIG. 2 is a block diagram showing a functional arrangement of a monitor control unit and a comparing determination unit in a laser monitor of the embodiment.

The monitor control unit 40 and the comparison decision unit 42 may be constituted by a microcomputer. FIG. 2 shows a functional configuration of the monitor control unit 40 and the comparison decision unit 42 in the embodiment.

Referring to FIG. 2, the monitor control unit 40 comprises a memory 52, a calculator 54, a timing generator 56 and a control logic 58. The memory 52 stores various selected data of monitoring conditions input from the input device 32, for instance a monitoring section, a monitoring point, a monitor reference waveform, an allowable value and a monitoring value. In the embodiment, a monitor reference waveform can be also used that corresponds to a laser power waveform of a pulsed laser beam LB oscillated and output from the laser oscillator 10, which has been normal or good. Such a monitor reference waveform corresponding to an actual normal laser power waveform is also stored in the memory 52.

The calculator 54 executes various computations necessary for monitor control, including a computation for determining a monitor reference waveform corresponding to an actual normal laser power waveform and a computation for determining a monitoring waveform or monitoring value as described later. The timing generator 56 operates in synchronization with the laser oscillation operation of the laser oscillator 10 under control of the laser control unit 14 to provide various timing signals or clock signals for monitoring to respective components such as the control logic 58 in the monitor control 40 and a decision logic 64 in the comparison decision unit 42.

The control logic 58 serves to manage and execute the entirely of setting operation of monitoring conditions and control operation of monitoring. In setting operation of monitoring conditions, the control logic 58 receives not only various selected values of monitoring conditions from the input device 32 in the above manner but also a digital measured laser power signal $D_B$ from the A-D converter 38 in order to set a monitor reference waveform corresponding to an actual normal laser power waveform. In monitoring control operation, the control logic 58 responds to a clock signal from the timing generator 56 during emission of a pulsed laser beam LB to provide upper and lower limits $LM_H$ and $LM_L$ to upper and lower limit comparators 60 and 62, respectively, in the comparison decision unit 42 and to provide a monitor timing signal $K_T$ representing the timing of each monitoring section or point to a decision logic 64 in the comparison decision unit 42.

The comparison decision unit 42 includes the upper limit comparator 60, the lower limit comparator 62 and the decision logic 64. As a pulsed laser beam LB is produced from the laser oscillator 10, a digital measured laser power signal $D_B$ from the A-D converter 38 is supplied to the upper and lower limit comparators 60 and 62.

The upper limit comparator 60 compares the measured laser power signal $D_B$ with an upper limit monitoring waveform or value $LM_H$ provided from the control logic 58 to generate a comparison result signal $CP_H$ representative of the comparison in magnitude between $D_B$ and $LM_H$. The lower limit comparator 62 compares the measured laser power signal $D_B$ with a lower limit monitoring waveform or value $LM_L$ from the control logic 58 to generate a comparison result signal $CP_L$ representative of the comparison in magnitude between $D_B$ and $LM_L$.

The comparison result signals $CP_H$ and $CP_L$ from the upper and lower limit comparators 60 and 62 are supplied to the decision logic 64 at the timing of each monitoring section or point given by the monitor timing signal $K_T$ from the control logic 58. The decision logic 64 makes a monitoring decision based on $CP_H$ and $CP_L$ to produce a decision result signal which is then supplied to the laser control unit 14, the display control unit 44 and an alarm generating circuit 48.

Turning to FIG. 1, the display control unit 44 displays the result of monitoring decision provided from the decision unit 42 by a visual presentation or by display lamps on the display 46. The display 46 may comprise a liquid crystals display, a CRT display or a photo diode display. The alarm generating circuit 48 drives the buzzer 50 to generate a predetermined sound of alarm when the result of monitoring decision is to be notified, particularly when the decision logic 64 has provided a decision result of "defective" or "bad". The display control unit 44 is connected to the monitor control unit 40 and to the laser control unit 14 so that various settings of monitoring conditions and laser control conditions can be displayed on the display 46.

Next, examples of methods to set or determine a laser control reference waveform, a monitor reference waveform, a monitoring waveform and a monitoring value in the laser beam processing apparatus of the embodiment will be described with reference to FIGS. 3 to 10.

Figure 3:
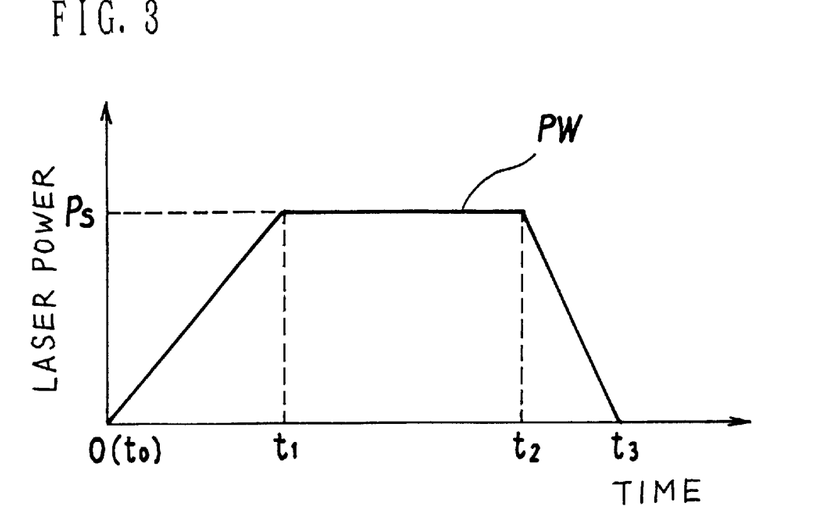
FIG. 3 is a diagram illustrating an example of a reference waveform for laser control provided in the embodiment.

FIG. 3 shows an example of reference waveform for laser control. The reference waveform shown PW is for controlling the laser power of a pulsed laser beam LB to be produced from the laser oscillator 10 and has a pulse duration or pulse width consisting of three split periods—a first period $[t_0\sim t_1]$, a second period $[t_1\sim t_2]$ and a third period $[t_2\sim t_3]$. The reference waveform PW rises lineally from zero to a peak value $P_S$ in the first period $[t_0\sim t_1]$ and keeps the peak value $P_S$ in the second period $[t_1\sim t_2]$ and falls lineally from the peak value $P_S$ to zero in the third period $[t_2\sim t_3]$. On the whole, the reference waveform PW takes the shape of a trapezoidal. Selected values for defining the reference waveform for laser control PW are input to the laser control unit 14 from the input device 32 and then stored in the form of a digital waveform data in the storage of the laser control unit 14.

FIGS. 4 to 9 show some examples of monitor reference waveforms and monitoring waveforms adaptable to the laser control reference waveform PW of FIG. 3.

Figure 4:
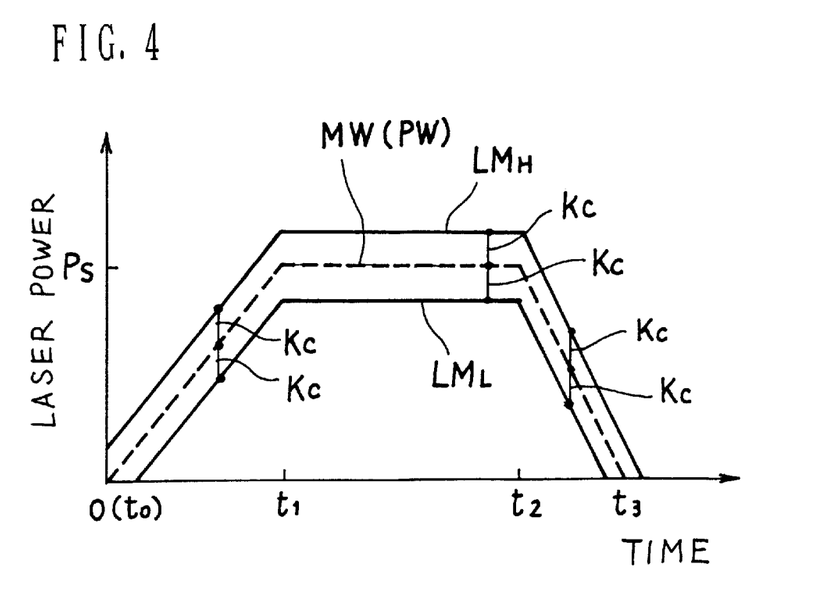
FIG. 4 is a diagram illustrating an example of a monitor reference waveform and a monitoring waveform provided in the embodiment.

Referring to FIG. 4, upper and lower limit monitoring waveforms $LM_H$ and $LM_L$ are set in a monitoring section extending over the whole pulse time of a monitor reference waveform MW corresponding to the reference waveform for laser control PW, wherein $LM_H$ and $LM_L$ are offset by an allowable value $K_C$ upward and downward, respectively, from every part of the monitor reference waveform MW.

The lower limit monitoring waveform $LM_L$ is omitted in the range of negative value of laser power around the start time $t_0$ and the terminal time $t_3$ because a laser beam can not have a negative value of laser power. In this method, data of the monitoring reference waveform MW as well as the allowable value $K_C$ are input by the input device 32 to the monitor control unit 40, which in turn produces data of the upper and lower monitoring waveforms $LM_H$ and $LM_L$ depending on MW and $K_C$. The allowable value $K_C$ may be input as a value of laser power (W) or as a value of ±%.

This setting method has an advantage that the monitor control unit 40 can easily execute the computation to determine the upper and lower monitoring waveforms $LM_H$ and $LM_L$. In this method, however, the sharper the slope of the reference waveform is, the narrower the margin of the allowable range in the direction of time axis is. In FIG. 4, for instance, the downslope of the reference waveform MW (PW) is rather sharp in the falling period $[t_2\sim t_3]$, whereby the time margin of the allowable range is considerably narrow in the period. When the time margin of the allowable range is too narrow, a slight deviation of time at which the laser power is measured can cause an actual laser power (measured value) to be out of the allowable range, namely leading to excessively high sensitivity of decision of "defective."

Figure 5:
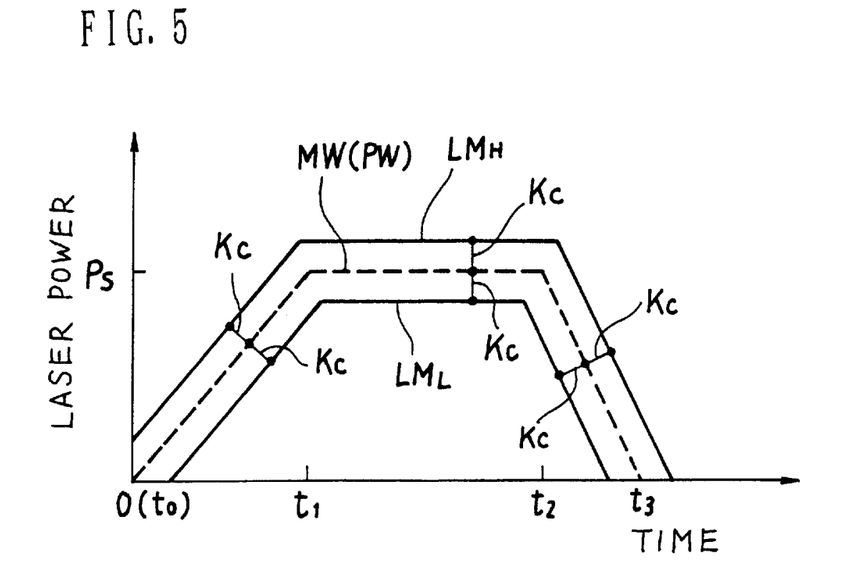
FIG. 5 is a diagram illustrating another example of a monitor reference waveform and a monitoring waveform provided in the embodiment.

Referring to FIG. 5, upper and lower limit monitoring waveforns $LM_H$ and $LM_L$ defined in a monitoring section covering over the whole pulse time of a monitor reference waveform MW corresponding to the laser control reference waveform PW are offset by an allowable value $K_C$ in the normal direction from every part of the monitor reference waveform MW.

In the same manner as the method of FIG. 4, the monitor control unit 40 determines the upper and lower monitoring waveforms $LM_H$ and $LM_L$ as shown in FIG. 5 on the basis of the selected values of the monitoring reference waveform MW and the allowable value $K_C$, which are input by the input device 32.

According to the method of FIG. 5, the time margin of the allowable range is permitted to keep a suitable width with respect to any given slope of the reference waveform. However the allowable range in the upward and downward direction varies depending on the degree of slope of the waveform. That is, the gentler the slope is, the smaller the upward and downward allowable range is, and the sharper the slope is, the larger the upward and downward allowable range is.

Figure 6:
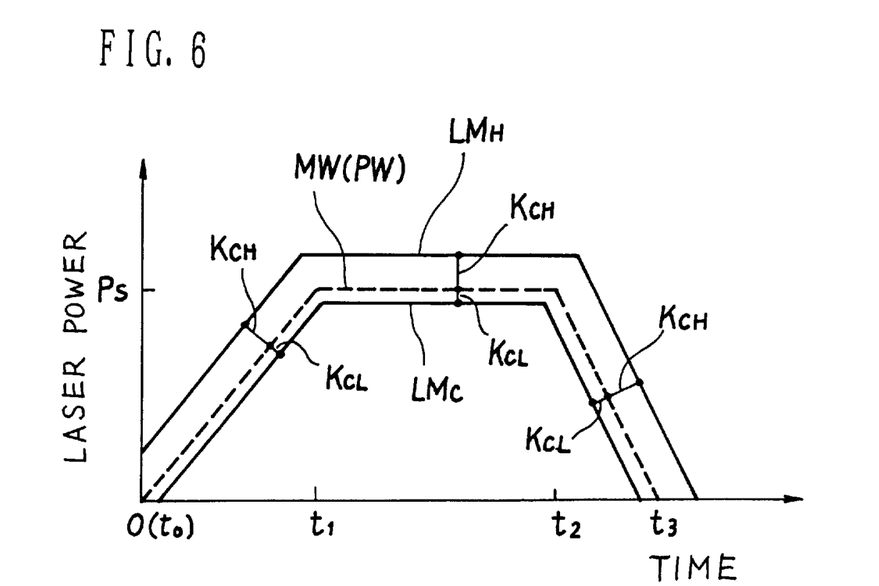
FIG. 6 is a diagram illustrating further example of a monitor reference waveform and a monitoring waveform provided in the embodiment.

FIG. 6 shows a modification of the setting method of FIG. 5, in which there is provided a difference between the upper and lower allowable values $K_{CH}$ and $K_{CL}$ by which the upper and lower monitoring waveforms $LM_H$ and $LM_L$ are offset respectively in the normal direction from every part of the reference waveform MW. As occasion demands, only one of the monitoring waveforms $LM_H$ and $LM_L$ can be selected.

Figure 7:
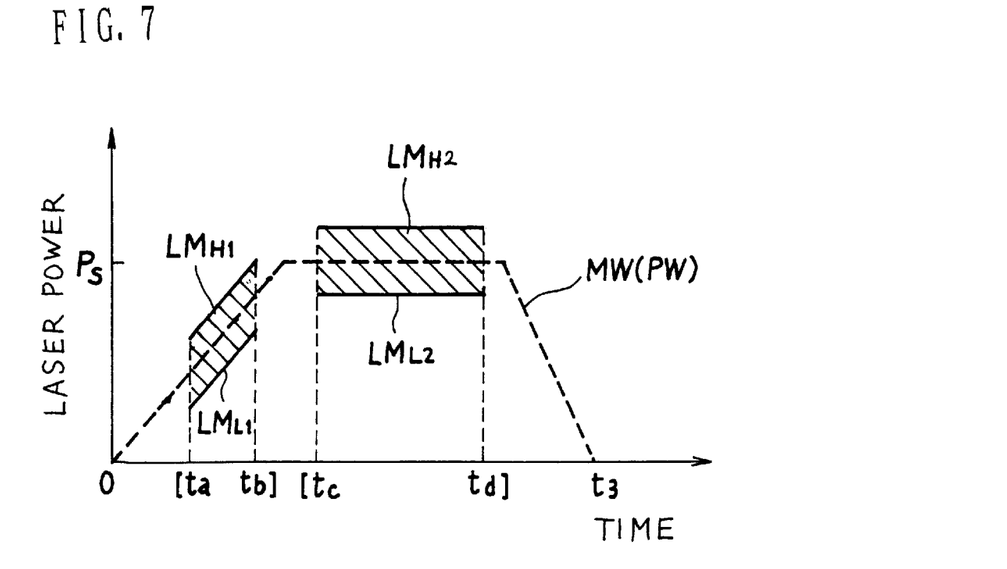
FIG. 7 is a diagram illustrating still another example of a monitor reference waveform and a monitoring waveform provided in the embodiment.

With reference to FIG. 7, monitoring sections $[t_a \sim t_b]$ and $[t_c \sim t_d]$ are provided in the rising period and the peak keeping period of the monitoring reference waveform MW, respectively, and upper and lower limit monitoring waveforms ($LM_{H1}$, $LM_{L1}$) and ($LM_{H2}$, $LM_{L2}$) are offset by an allowable value $K_C$ upward and downward, respectively, from the reference waveform MW in each of the monitoring sections $[t_a \sim t_b]$ and $[t_c \sim t_d]$.

The method of FIG. 7 defines a monitoring section or point not in the whole period of the monitor reference waveform MW but in a selected part (usually, an important part) to be monitored selectively or preponderantly, while excluding or neglecting the remaining part (unimportant part) from the object of monitoring. According to this method, the monitor decision function is prevented from being disturbed by a distortion of a laser power waveform which may be produced due to the properties of the laser electric power supply 12 and the laser oscillator 10, thereby permitting a more complicated monitor reference waveform to be selected.

Figure 10:
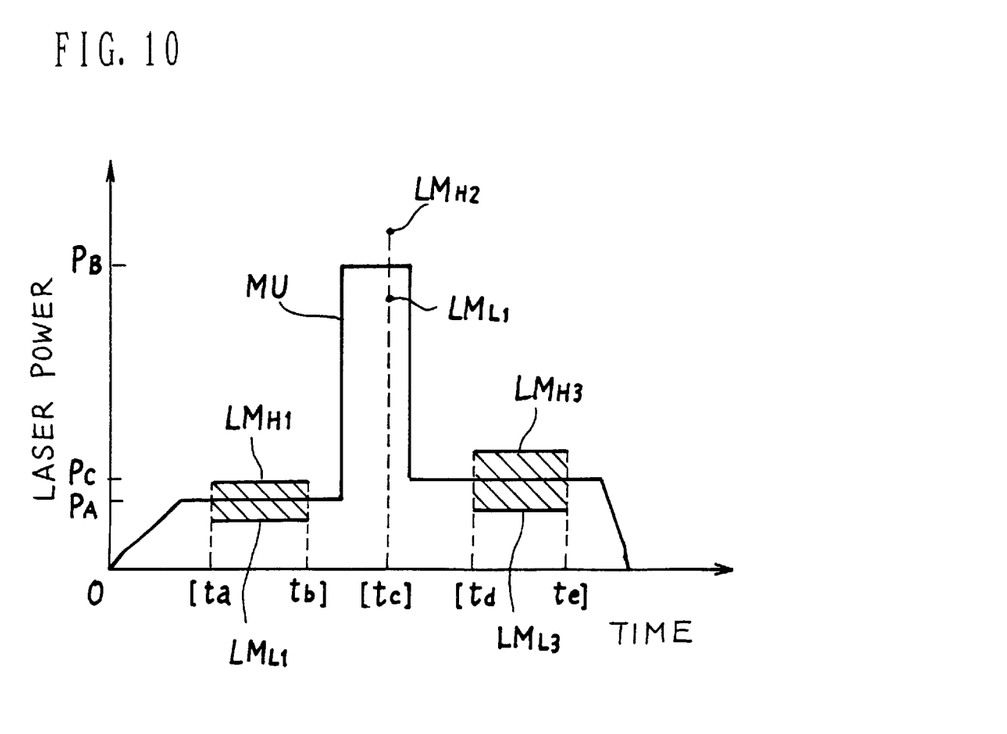
FIG. 10 is a diagram illustrating an example of a monitor reference waveform, monitoring waveform and monitoring value provided in the embodiment.

FIG. 10 shows an example of the setting method of FIG. 7 applied to a more complicated monitor reference waveform MU. The reference waveform MU provides three important conditions. The first condition is to keep the laser power constant at a relatively low level $P_A$ in the period of the front part of the reference waveform NMU. The second is to raise the laser power to a considerably high level $P_B$ in the period of the central part of MU. The third is to keep the laser power constant at another relatively low level $P_C$ in the period of the rear part of MU. The transitional portions of the waveform MU (the rising and falling periods) preceding and succeeding the above three intermediate portions are not so important. Thus, monitoring sections $[t_a \sim t_b]$ and $[t_d \sim t_e]$ are set in the front and rear selected level portions of MU having a relatively long period, respectively, and a monitoring point $[t_c]$ is set in the central selected level portion of MU having a relatively short period. Moreover, upper and lower monitoring waveforms ($LM_{H1}$, $LM_{L1}$) and ($LM_{H3}$, $LM_{L3}$) and upper and lower monitoring points ($LM_{H2}$, $LM_{L2}$) are set with different allowable ranges in the monitoring sections $[t_a \sim t_b]$ and $[t_d \sim t_e]$ and in the monitoring point $[t_c]$, respectively.

Even when the laser control unit 14, the laser electric power supply 12 and the laser oscillator 10 normally operate with respect to the laser control reference waveform PW and the obtained weld quality in the workpieces ($W_1$, $W_2$) is good, the measured laser power values ($S_B$, $D_B$) provided from the laser power measuring units (34, 36, 38) do not always approximate to the laser control reference waveform PW. Actually, it is common that the laser control reference waveform PW is influenced by the properties of the laser electric power supply 12 and the laser oscillator 10 so that errors of various patterns and degrees occur between the measured laser power values ($S_B$, $D_B$) and the laser control reference waveform PW. Such errors can be compensated or masked by the above method of setting a monitoring section and point in a selected part or period of the monitor reference waveform.

Alternatively, such errors can be effectively compensated by a method of determining a monitor reference waveform corresponding to the reference waveform for laser control on the basis of data of the measured value (emprical value). In this method, an actual laser power waveform by which a good weld quality has been obtained in the workpieces ($W_1$, $W_2$) is calculated based on the measured laser power value ($D_B$) and the data of the actual laser power waveform is registered as a monitor reference waveform in the memory 52. Using the average value of measured values of more than one good laser power waveforms can improve the reliability of the determined monitor reference waveform, thus assuring a still better result of processing.

Figure 8:
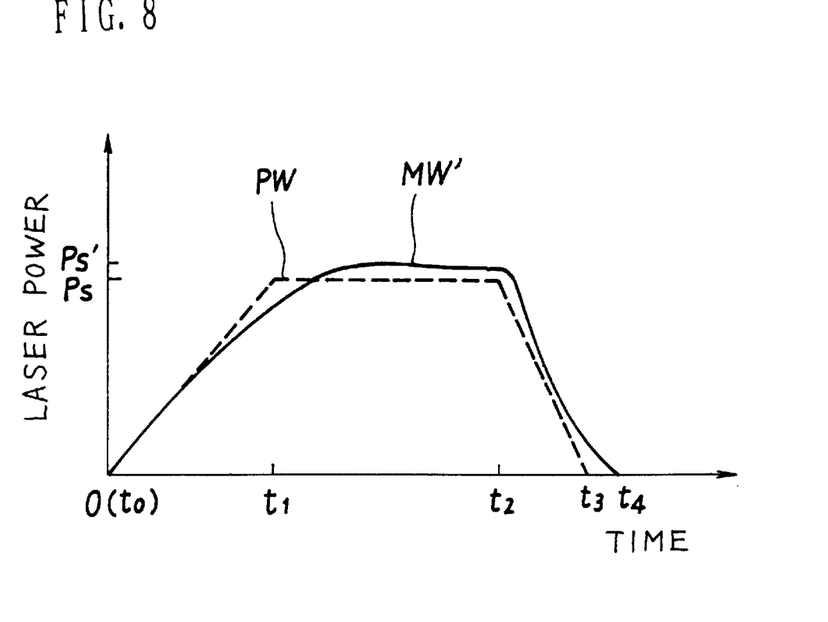
FIG. 8 is a diagram illustrating an additional example of a monitor reference waveform provided in the embodiment.

FIG. 8 shows an example of a monitor reference waveform MW' determined based on the data of measured values (emprical values) with respect to the laser control reference waveform PW of FIG. 3.

Figure 9:
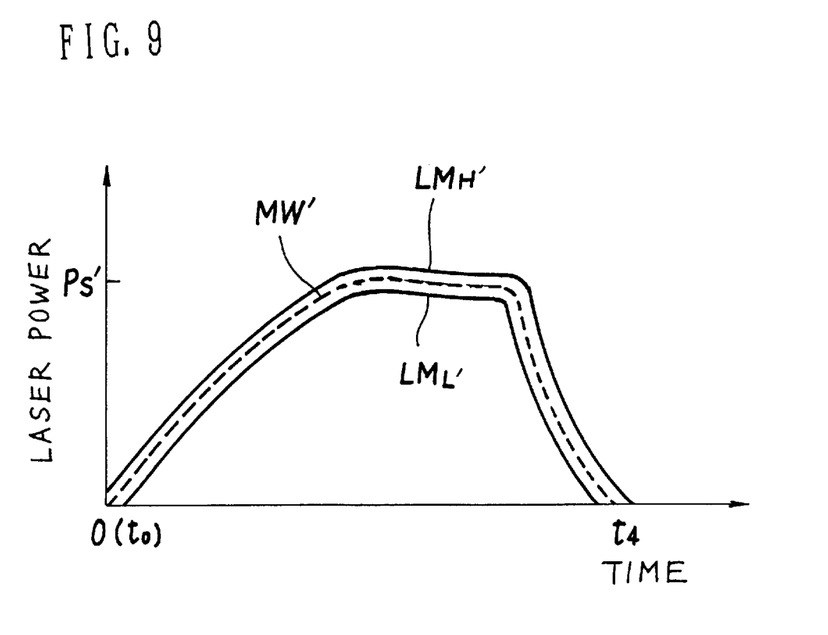
FIG. 9 is a diagram illustrating an additional example of a monitoring waveform provided in the embodiment.

FIG. 9 shows upper and lower limit monitoring waveforms $LM_{H'}$ and $LM_{L'}$ determined by the same method as that of FIG. 5 with respect to the monitor reference waveform MW' of FIG. 8. The other methods of the embodiment, for example the methods of FIG. 4 and FIG. 7 can be employed to determine a monitoring waveform or monitoring point for such monitor reference waveform MW'. In either method of those, since the monitor reference waveform MW' based on the actual laser power waveform (measured value) is highly precise, a small (strict) value for an allowable range can be selected to improve the precision of monitoring decision and thereby to raise the level of quality control.

Next, operation of the pulsed laser beam processing apparatus, especially the laser monitor 18 in the embodiment, will be described.

The laser control unit 14 makes the laser electric power supply 12 start to operate after sending a start signal ST for notifying the start timing to the monitor control unit 40. The laser electric power supply 12 supplies a driving electric power, driving current or driving voltage corresponding to the laser control reference waveform PW to the laser excitation source 22. The excitation beam EB emitted from the laser excitation source 22 excites the solid-state laser medium 20 so that a pulsed laser beam LB is produced from the output mirror 26. The output pulsed laser beam LB is sent via the mirror 28 to the laser projection unit 16, from which the pulsed laser beam is projected onto the workpieces ($W_1$, $W_2$). The laser control unit 14 controls the laser electric power supply 12 by an open-loop control method or a feedback control method for waveform control so that the laser power of the pulsed laser beam LB can follow the laser control reference waveform PW.

When the pulsed laser beam LB is oscillated and output from the laser oscillator 10, a laser beam LB' which is a part (e.g. 0.1%) of the laser beam LB and which has transmitted the mirror 28 is received (detected) by the photo censor 34. Then, the laser power measuring circuit 36 generates a measured laser power signal $S_B$ representing an instantaneous value of power of the pulsed laser beam LB. The A-D converter 38 supplies to the comparison decision unit 42 a digital measured laser power signal $D_B$ corresponding to the analog voltage signal $S_B$.

In the comparison decision unit 42, upper and lower limit comparators 60 and 62 compare the digital measured laser power signal $D_B$ input from the A-D converter 38 with the digital data of the upper monitoring waveform or value $LM_H$ and the lower monitoring waveform or value $LM_L$ which are provided from the monitor control unit 40 in synchronization with (at the same data rate as) the signal $D_B$. Then, the upper and lower comparators 60 and 62 generate comparison result signals $CP_H$ and $CP_L$ representing the comparisons in magnitude between $D_B$ and [$LM_H$, $LM_L$], respectively. The comparison result signals $CP_H$ and $CP_L$ from the comparison decision unit 42 are supplied to the decision unit 64 which in turn analyzes and integrates the signals $CP_H$ and $CP_L$ to generate a monitoring decision result after the pulse time or duration of the pulsed laser beam LB terminates.

There are various modes in the monitoring decision result provided from the comparison decision unit 42. A basic mode is to inform whether or not the actual laser power waveform of the pulsed laser beam LB has deviated from the allowable range defined by the monitoring waveform or value. Computing out a point at which the actual laser power waveform has deviated, if any, is advantageous.

Figure 11:
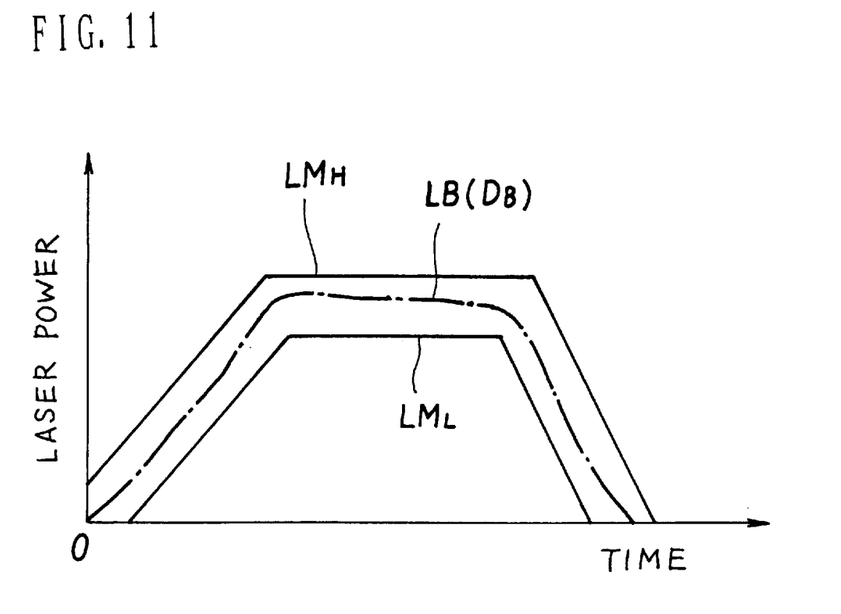
FIG. 11 is a diagram illustrating how a laser monitor is performed in the embodiment.

For example, in the case of setting the monitor reference waveform MW and the upper and lower limit monitoring waveforms $LM_H$ and $LM_L$ as shown in FIG. 4, when a pulsed laser beam LB having a laser power waveform as shown in FIG. 11 is produced, the laser power waveform is within the allowable range over the whole of the monitoring section. Therefore, a monitoring decision result notifying that the pulsed laser beam LB is "normal" would be provided.

Figure 12:
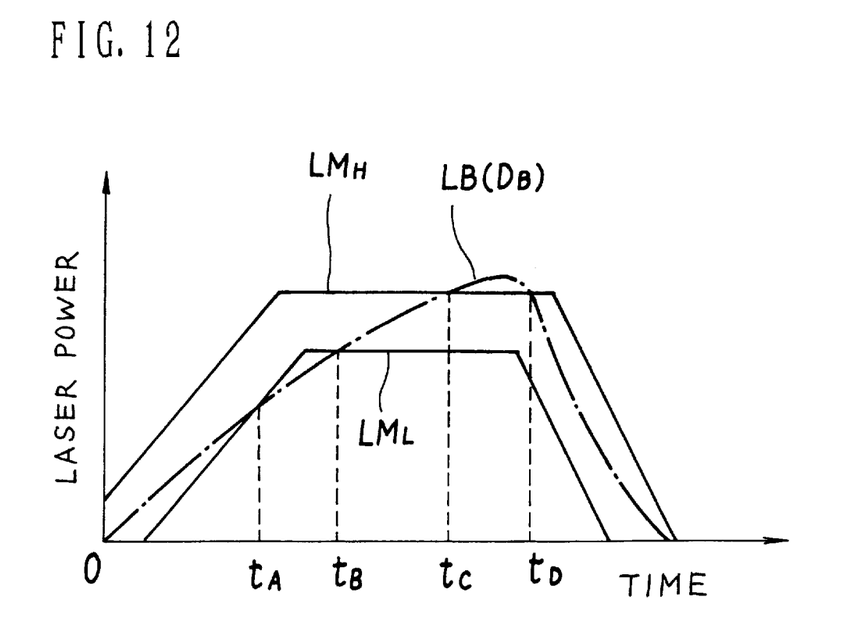
FIG. 12 is a diagram illustrating how a laser monitor is performed in the embodiment.

In an example of FIG. 12, however, the actual or measured laser power waveform of the pulsed laser beam LB deviates from the allowable range in the middle of the pulse time. In that case, another monitoring decision result notifying that the pulsed laser beam LB is "defective" would be provided.

As occasion demands, the deviation positions [$t_A$~$t_B$], [$t_C$~$t_D$] may be indicated on display, too. Moreover, a predetermined sound of alarm may be generated from the buzzer 50 that is energized by the alarm generating circuit 48.

In a pulsed laser processing apparatus such as in the embodiment, it is also advantageous to provide a monitoring decision regarding a quality of weld obtained in the workpieces ($W_1$, $W_2$). Generally, a decision of "good" or "bad" may be given on the obtained weld quality in accordance with a decision of "normal" or "defective" on the pulsed laser beam LB. However, different decision criteria can apply between "good" or "bad" of weld quality and "normal" and "defective" of pulsed laser beam. For instance, in a case of setting plurality of monitoring sections or points as shown in FIG. 7 and FIG. 10, when the measured laser power value is out of the allowable range in at least one of the monitoring sections or points, a decision of "defective" may be made on the pulsed laser beam LB in the above manner while a decision of "good" may be made on the resulting weld quality depending on the position of the deviation.

In the illustrated embodiment, the laser monitor 18 is incorporated in the pulsed laser beam processing apparatus. However the laser monitor 18 can be in the form of an independent unit which is electrically connected to the main unit or laser control unit of the processing apparatus by an electric cable. In the case of an independent unit, the laser monitor 18 may be provided with necessary peripheral equipments such as an input device, a display and so on separately from the main unit or laser control unit in the processing apparatus.

In the illustrated embodiment, a monitor reference waveform is set with respect to the laser power waveform of a pulsed laser beam LB. However, in the same manner as the laser control reference waveform in the laser control unit 14, a monitor reference waveform can be set to a waveform of an electric parameter corresponding to the power of a pulsed laser beam LB, for example, a driving current, driving voltage or driving electric power. In that case, the measuring means of the laser monitor apparatus may be composed to measure the instantaneous value of such electric parameter.

Although the illustrated embodiment relates to a pulsed laser processing apparatus, the present invention can be also adapted to a laser beam processing apparatus of the continuous wave type and to other laser apparatuses than a laser beam processing apparatus.

What is claimed is:

1. A laser monitor apparatus comprising:
   reference waveform setting means for setting a monitor reference waveform corresponding to a reference waveform for waveform control used in a laser apparatus;
   first monitoring condition setting means for setting one or more of monitoring sections or points in any desired periods or at any desired points of time in said monitor reference waveform;
   second monitoring condition setting means for setting a monitoring waveform or monitoring value as an upper and/or lower limit being offset by a desired allowable value from said monitor reference waveform in each of said monitoring sections or points;
   measuring means for measuring the laser power of said laser beam or a corresponding predetermined electric parameter;
   comparing means for comparing a measured value provided by said measuring means with said monitoring waveform or value at each of said monitoring sections or points; and
   decision means for providing a monitor decision result based on the comparison result from said comparing means.

2. The laser monitor apparatus of claim 1 wherein said reference waveform setting means comprises a setting means for setting said monitor reference waveform based on the measured value provided by said measuring means.

3. The laser monitor apparatus of claim 1 wherein said second monitoring condition setting means comprises a setting means for individually setting allowable values in said monitoring sections or points.

4. The laser monitor apparatus of claim 1 wherein said decision means comprises means for analyzing and integrating a comparison result from said comparison means to provide a monitor decision on whether the laser beam processing has been normal or defective.

5. The laser apparatus of claim 2 wherein said predetermined parameter is at least one of an electric power, a current and a voltage supplied from said laser electric power supply means to said laser oscillation means.

6. A laser apparatus comprising:

laser oscillation means supplied with electric power for oscillating a laser beam;

laser electric power supply means for supplying electric power to said laser oscillation means;

first reference waveform setting means for setting a desired reference waveform for waveform control with respect to the laser power of said laser beam or a corresponding predetermined electric parameter;

laser control means for controlling said laser electric power supply means so that the laser power of said laser beam or said predetermined electric parameter can follow said reference waveform for waveform control;

second reference waveform setting means for setting a monitor reference waveform corresponding to said reference waveform for waveform control;

first monitoring condition setting means for setting one or more of monitoring sections or points in any desired periods or at any desired points of time in said monitor reference waveform;

second monitoring condition setting means for setting a monitoring waveform or a monitoring value as an upper and/or lower limit being offset by a desired allowable value from said monitor reference waveform in each of said monitoring sections or points;

measuring means for measuring the laser power of said laser beam or the corresponding predetermined electric parameter;

comparing means for comparing a measured value provided by said measuring means with said monitoring waveform or value at each of said monitoring sections or points; and decision means for providing a monitor decision result based on the comparison result from said comparing means.

7. A laser beam processing apparatus comprising:

laser oscillation means supplied with electric power for oscillating a laser beam;

laser electric power supply means for supplying electric power to said laser oscillation means;

laser projection means to receive said laser beam from said laser oscillation means for projecting said laser beam on a workpiece to be processed;

first reference waveform setting means for setting a desired reference waveform for waveform control with respect to the laser power of said laser beam or a corresponding predetermined electric parameter;

laser control means for controlling said laser electric power supply means so that the laser power of said laser beam or said predetermined electric parameter can follow said reference waveform for waveform control;

second reference waveform setting means for setting a monitor reference waveform corresponding to said reference waveform for waveform control;

first monitoring condition setting means for setting one or more of monitoring sections or points in any desired periods or at any desired points of time in said monitor reference waveform;

second monitoring condition setting means for setting a monitoring waveform or a monitoring value as an upper and/or lower limit being offset by a desired allowable value from said monitor reference waveform in each of said monitoring sections or points;

measuring means for measuring the laser power of said laser beam or the corresponding predetermined electric parameter;

comparing means for comparing a measured value provided by said measuring means with said monitoring waveform or value at each of said monitoring sections or points; and decision means being responsive to a comparison result from said comparison means for providing a monitor decision on whether the resulting laser beam processing in said workpiece is good or bad.

* * * * *